Figures 1, 2:
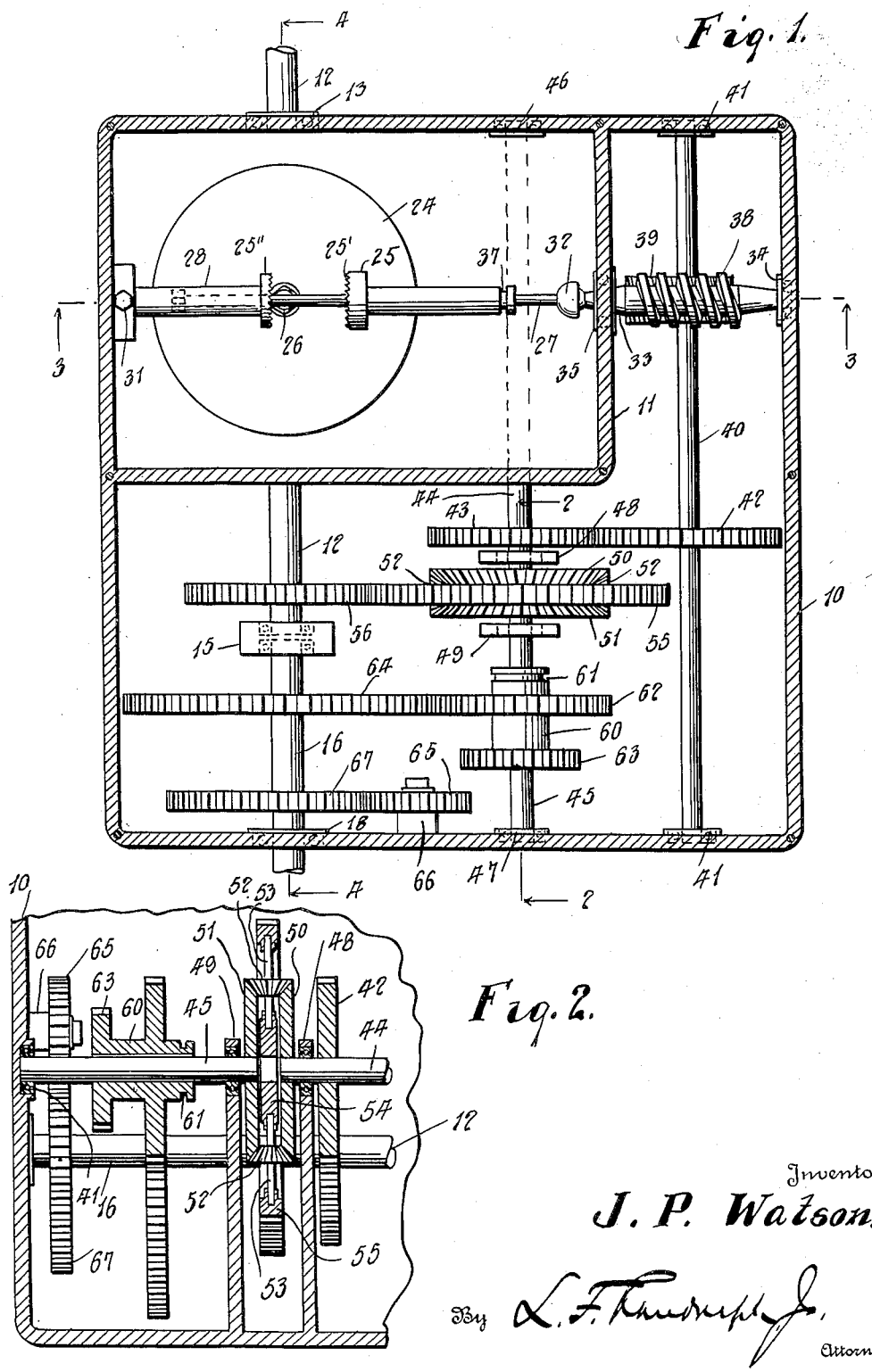

May 30, 1933.  J. P. WATSON  1,911,217
TRANSMISSION MECHANISM
Filed March 3, 1932  2 Sheets-Sheet 1

Inventor
J. P. Watson,
By [signature]
Attorney

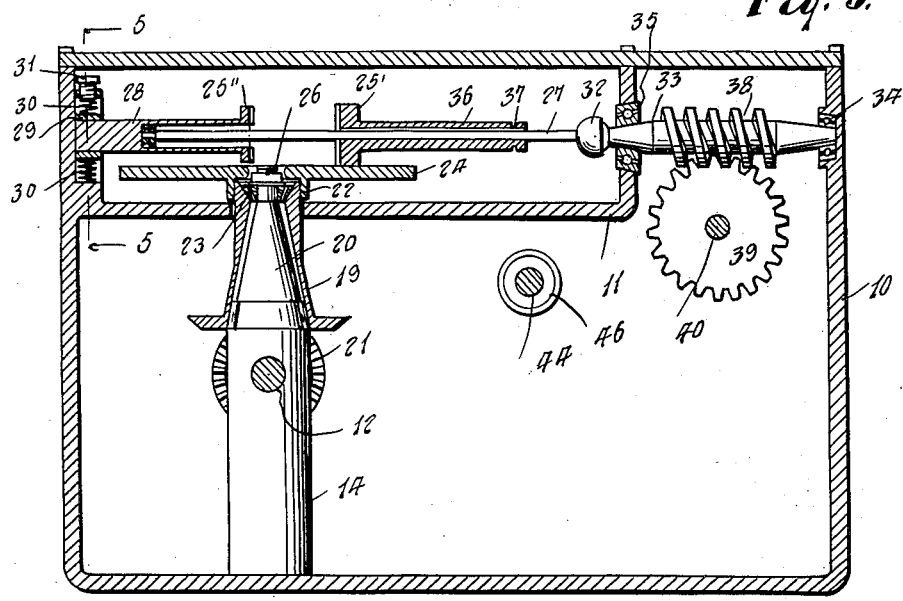
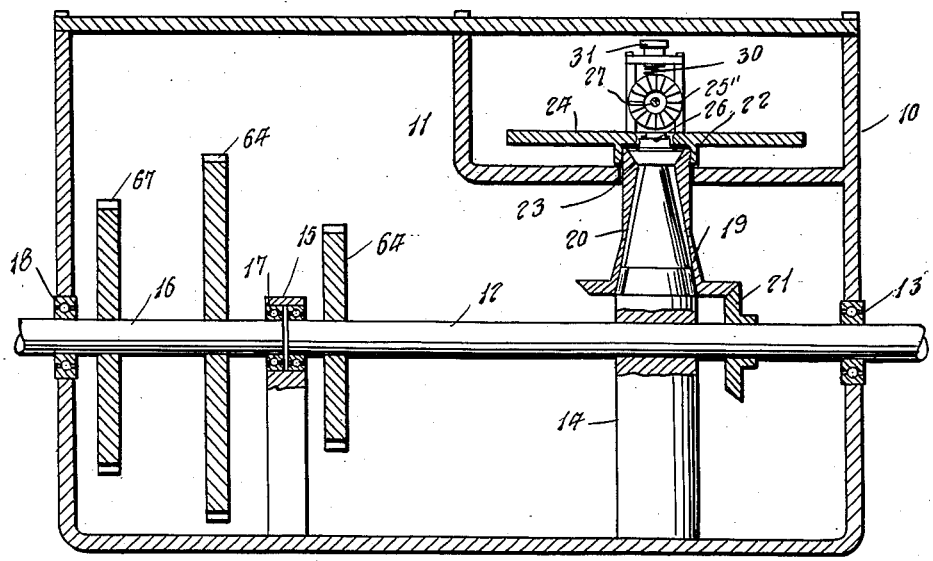
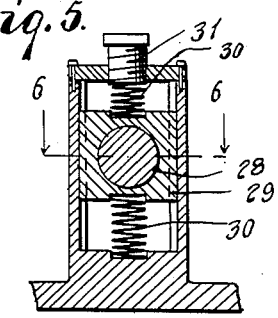

Patented May 30, 1933

1,911,217

UNITED STATES PATENT OFFICE

JOHN P. WATSON, OF ELSA, TEXAS

TRANSMISSION MECHANISM

Application filed March 3, 1932. Serial No. 596,617.

This invention relates to a mechanism for the transmission of mechanical power and it aims to provide a novel construction which is relatively inexpensive in construction and maintenance, easily operable, and which will permit practically infinite variability merely by operation of a lever or the like.

It is further aimed to provide a construction which will enable steady increase or variations in speed without disconnecting gears, jerks and strain on the machinery The transmission is adapted as a general purpose proposition in that it is capable of use in any relation desired and irrespective of the size of the machinery, and for instance on cars, trucks, tractors, shop machinery and the like.

A particular object is to provide a novel construction wherein the speed is controlled primarily by a differential mechanism controlled by a friction device requiring a slight amount of friction.

The more specific objects and advantages will become apparent from a consideration of the description following taken in connection with accompanying drawings illustrating an operative embodiment.

Figure 1 is a horizontal section view looking downwardly on the improved transmission, Figure 2 is a vertical sectional view taken on the line 2—2 of Figure 1, Figure 3 is a vertical sectional view taken on the line 3—3 of Figure 1, Figure 4 is a vertical sectional view taken on the line 4—4 of Figure 1, Figure 5 is a detail section taken on the line 5—5 of Figure 3, and Figure 6 is a detail section taken on the line 6—6 of Figure 5.

Referring specifically to the drawings, one embodiment is shown by way of example, of which 10 is a suitable sectional casing or housing. Such housing is adapted to contain oil in which the various parts operate but a portion thereof is isolated by means of a partition wall at 11 adjacent the top of the housing.

Suitably journaled in the housing is a shaft 12, which is the drive shaft, the same being journaled, for example, in bearings at 13, 14, and 15. A driven shaft is shown at 16 separate from and alined with the drive shaft 12 and preferably mounted in bearings 17 and 18, such shaft extending to the desired point of application of the work or power.

A bevel gear 19 is on an upper conical portion 20 of the bearing 14 and the same is in mesh with a bevel gear 21 on the drive shaft 12. Suitably screwed as at 22 to a sleeve 23 of the gear 19, which extends through and above the partition 11, is a disk or plate 24, the direction of the screw threads being such that rotation of the plate tends to tighten the latter on the extension 23.

Plate 24 is a friction gear or member which is adapted to drive or rotate a friction wheel 25 which is movable diametrically of the friction wheel 24 between the center thereof and periphery. The center of the friction wheel 24 is open or cut away as at 26 so that when the wheel 25 is disposed thereover, the wheel 24 does not drive the same. The wheel 25 is slidable on and keyed to a shaft 27 so that the rotation of the wheel 25 will rotate the shaft 27. Shaft 27 at one end is journaled in a vertically movable and adjustable bearing 28. Such bearing 28 is guided by interengaging grooves and ribs at 29 and is engaged above and below by expansive coil springs 30, with one of which a screw 31 is engaged and operable so as to vary the tension of the spring and thereby regulate the height of the bearing 28. In this manner, the degree of friction between the wheel 25 and wheel 24 may be regulated. This is especially true since the shaft 27 at 32 has a universal driving connection with a short shaft 33 journaled by bearings 34 and 35, in the casing 10 and partition 11, respectively. The friction wheel 25 has an elongated sleeve 36 thereon provided with an annular groove at 37 which is adapted to be engaged by a fork on a hand lever or the like in order to manually shift the gear member 25 radially of the friction plate 24.

The shaft 33 has a worm 38 thereon which is in mesh with a worm wheel 39 keyed to a control shaft 40 disposed at a right angle to and below the shaft 33 and journaled in bearings 41 on the casing 10. Shaft 40 has a gear wheel 42 keyed thereto which meshes with a gear wheel 43 carried by a shaft 44. Shaft 44 is alined with a shaft 45, such shafts 44 and 45 being differential shafts and journaled in bearings as at 46 and 47 on the casing 10, and 48 and 49 within the casing.

Said shafts 44 and 45 comprise parts of a differential mechanism which also includes bevel gears 50 and 51, keyed to shafts 44 and 45, respectively. Meshing with both bevel gear wheels 50 and 51 are a series of bevel gear wheels 52, bridged on shafts 53 and journaled in a hub 54 and a gear wheel or ring 55, such shafts 53 being disposed with their axes diametric with respect to the axis of shafts 44 and 45 and being rotatable on their axes.

Gearing 55 is in mesh with a gear wheel 56 geared to the shaft 12.

The drive imparted to the shaft 16 may be forward or reverse and to this end a sleeve 60 is both rotatable with and slidable along the differential shaft 45, having an annular groove at 61 for engagement by a manually operable fork on a lever or the like to effect the shifting. Said sleeve 60 carries gear wheels 62 and 63 respectively. The former is adapted to mesh with a gear wheel 64 keyed on shaft 16 in order to impart a forward drive to the shaft 16. In order to impart a reverse drive to the shaft 16, sliding movement of the sleeve 60 meshes the gear wheel 63 with an intermediate or idler gear 65 journaled on a stub shaft 66 on the casing 10, and the latter meshes with a gear 67 keyed to shaft 16 and which imparts a reverse drive to the shaft 16.

In the operation of the device, when moving at the greatest speed, the friction wheel 25 is disposed over the opening 26, in which position, in order to overcome any tendency of movement therefrom, interengaging teeth 25' are provided on the same and on an enlargement 25'' on the bearing 28. Under these conditions the drive shaft 12 will, through the medium of gear wheel 56 impart motion to the differential and the latter through the shaft 45 will impart motion to the shaft 16 in a forward direction when desired through the meshing of gears 62 and 64 and in a rearward direction when desired through the meshing of gear 63 with intermediate gear 65, the gears and shafts not forming part of this drive simply freely or idly rotating.

In the event a variation of said speed is desired friction wheel 25 is moved radially of the friction wheel 24, which latter is always driven through the action of the shaft 12 and gears 21 and 19, the position of the friction wheel 25 with respect to the axis of the wheel 24, of course governs the speed of the friction wheel 25. Such driving of the friction wheel 25 operates shaft 27, shaft 33, worm 38, worm wheel 39, shaft 40, gears 42 and 43, and the differential. It will be seen that the differential feature permits rotation from either side, following the line of least resistance. The operation of the parts through the coaction of plates 24 and wheel 25 serving to retard rotation, and thus to drive the shaft 16 at less speed than when driven by gear wheel 56 through the differential unaffected.

Various changes may be resorted to provided they fall within the spirit and scope of the invention.

What I claim as my invention:—

1. In a transmission mechanism, a driving shaft, a driven shaft, a differential mechanism geared to said driving shaft, alined shafts driven by said differential, one of said alined shafts geared to the driven shaft, a control shaft geared to the other alined shaft, and friction gearing driven by the driving shaft and geared to said control shaft to vary the speed of the driven shaft relatively to the driving shaft.

2. In a transmission mechanism, a driving shaft, a driven shaft, a differential mechanism geared to said driving shaft, alined shafts driven by said differential, one of said alined shafts geared to the driven shaft, a central shaft geared to the other of said alined shafts, a friction disk driven by said driving shaft, a friction wheel driven by said friction disk, a shaft carrying said friction wheel and geared to said control shaft, and means slidably mounting said friction wheel on the last mentioned shaft for adjustment of the friction wheel relatively to the friction disk to vary the speed of the control shaft and the driven shaft relatively to the driving shaft.

3. In a transmission mechanism, a driving shaft, a driven shaft, a differential mechanism geared to said driving shaft, alined shafts driven by said differential, one of said alined shafts geared to the driven shaft, a control shaft geared to the other of said alined shafts, a friction disk driven by said driving shaft, a friction wheel driven by said friction disk, a shaft carrying said friction wheel and geared to said control shaft, means slidably mounting said friction wheel on the last mentioned shaft for adjustment of the friction wheel relatively to the friction disk to vary the speed of the control shaft and the driven shaft relatively to the driving shaft, a bearing for said last mentioned shaft, spring means cushioning said bearing, and means to adjust the tension of said cushioning means to regulate the pressure of said friction wheel on the disk.

4. In a transmission mechanism, a driving shaft, a driven shaft, a differential mechanism geared to said driving shaft, alined shafts driven by said differential, one of said alined shafts geared to the driven shaft, a control shaft geared to the other of said alined shafts, a friction disk driven by said driving shaft, a friction wheel driven by said friction disk, a shaft carrying said friction wheel and geared to said control shaft, means slidably mounting said friction wheel on the last mentioned shaft for adjustment of the friction wheel relatively to the friction disk to vary the speed of the control shaft and the driven shaft relatively to the driving shaft, said friction disk having a central opening, a bearing for the last mentioned shaft, the friction wheel and bearing having interengaging teeth, the friction wheel being adjustable relatively to the friction disk to vary the speed of the control shaft and the driven shaft relatively to the driving shaft and also into position alined with the opening in the disk and with the teeth engaged.

5. In a transmission mechanism, a driving shaft, a driven shaft, a differential mechanism geared to the driving shaft, alined shafts driven by said differential, one of said alined shafts geared to the driven shaft, a control shaft geared to the other alined shaft, and means operatively connected to the driving shaft to vary the speed of the control shaft and thereby vary the speed of the driven shaft.

6. In a transmission mechanism, a driving shaft, a driven shaft, a differential mechanism geared to the driving shaft, alined shafts driven by said differential, a gear wheel secured to the driven shaft, another gear wheel secured to the driven shaft, an idler pinion in mesh with the said last mentioned gear wheel, a sleeve slidably and rotatably mounted on one of the alined shafts, gear wheels secured to said sleeve and selectively engageable with the idler pinion and with the first mentioned gear wheel on the driven shaft, a control shaft geared to the other of the alined shafts, and means operatively connected to the driving shaft to vary the speed of the control shaft and thereby vary the speed of the driven shaft.

7. In a friction gearing, a driven friction disk, a friction wheel for engagement with said disk, a shaft splined to said wheel, a bearing member for said shaft, cushioning means supporting said bearing member, and means to adjust said cushioning means to regulate the pressure of said wheel on the disk.

8. In a friction gearing, a driven friction disk having a central opening, a friction wheel for engagement with said disk, a shaft splined to said wheel, a bearing member for said shaft, cushioning means supporting said bearing member, means to adjust said cushioning means to regulate the pressure of said wheel on the disk, and interengaging teeth on said wheel and bearing, said wheel being movable on the surface of the disk to vary its speed of rotation and also into position alined with the opening in the disk and with said teeth engaged to stop the rotation of the wheel.

In testimony whereof I affix my signature.

JOHN P. WATSON.